United States Patent [19]

Krake

[11] 4,380,034
[45] Apr. 12, 1983

[54] TRACK CENTERING SERVO PULSE NOISE FILTER

[75] Inventor: Guss L. Krake, Richfield, Minn.

[73] Assignee: Magnetic Peripherals Inc., Minneapolis, Minn.

[21] Appl. No.: 191,471

[22] Filed: Sep. 26, 1980

[51] Int. Cl.³ ............................................ G11B 21/10
[52] U.S. Cl. ..................................................... 360/77
[58] Field of Search ........................ 360/77, 70, 78, 75

[56] References Cited

U.S. PATENT DOCUMENTS

| | | | |
|---|---|---|---|
| 3,893,180 | 7/1975 | Braun et al. | 360/77 |
| 4,092,683 | 5/1978 | Andrews, Jr. et al. | 360/77 |
| 4,130,844 | 12/1978 | Klinger | 360/77 |
| 4,148,082 | 4/1979 | Okada et al. | 360/77 |
| 4,149,199 | 4/1979 | Chick et al. | 360/77 |
| 4,188,646 | 2/1980 | Sordello et al. | 360/77 |
| 4,204,234 | 5/1980 | Noble | 360/77 |
| 4,230,809 | 12/1980 | Fujiki et al. | 360/77 |

Primary Examiner—Alfred H. Eddleman
Attorney, Agent, or Firm—Edward P. Heller, III; Joseph A. Genovese

[57] ABSTRACT

A track centering servo pulse noise filter is provided. Prerecorded pulses on a disk track's even and odd half tracks are sensed by the disk's read head, preamplified, DC biased, peak detected, and stored on a FIFO basis into a noise filter comprising two sets of N analog sample and hold cells, one set for the even pulses and one set for the odd pulses. The output of each even-pulse sample and hold cell is input to a summing junction to form an average of the last N pulses. The same is done with the outputs of the odd-pulse sample and hold cells. The two summing junctions are then input to a differential amplifier to form a position error signal to the disk head track centering servo system for keeping the head centered on the track.

7 Claims, 14 Drawing Figures

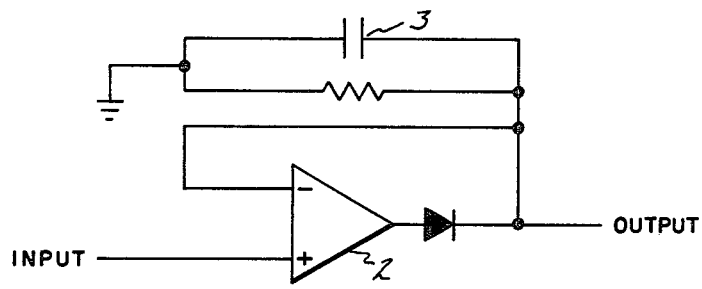
Fig. 2
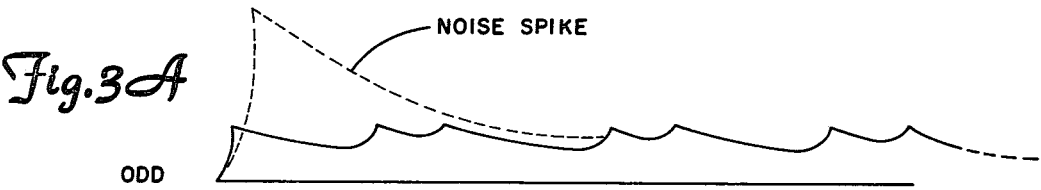
Fig. 3A  ODD
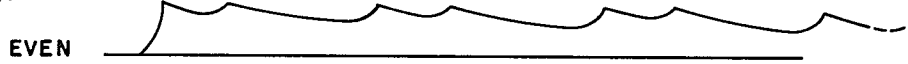
Fig. 3B  EVEN
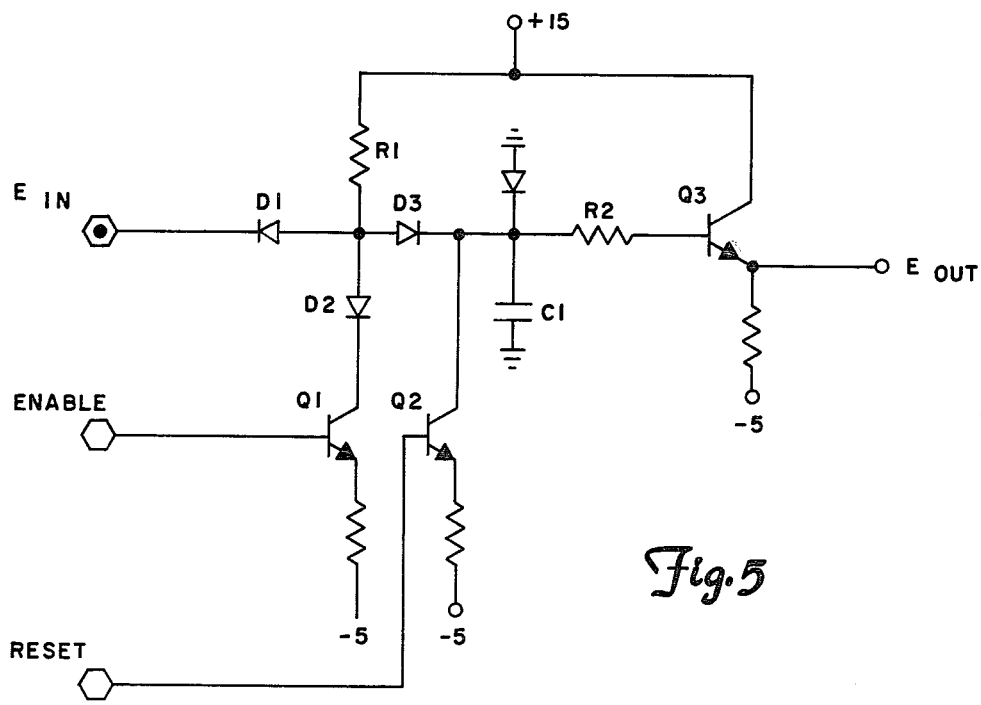
Fig. 5

TRACK CENTERING SERVO PULSE NOISE FILTER

BACKGROUND OF THE INVENTION

1. Field of the Invention

The invention relates generally to the field of data processing and more specifically to disk head track centering servo systems.

2. Brief Description of the Prior Art

Disk head track centering servo systems are of two general types: dedicated servo disk and embedded servo data. In the former, a servo head reads servo data constantly from prerecorded tracks of servo data on a servo disk. In the latter, the data head reads segments of prerecorded servo data interspersed among data segments on a data track. In both cases, a position error signal is developed from the servo data which drives a servo actuator to position the servo or data head over track center. In the case of a dedicated disk, the position error signal is updated constantly. With embedded servo data, the position error signal must be held while the disk rotates over a segment of data on the data track.

Servo data is generally composed of a pattern of one type written on one track and a pattern of a second type written on an adjacent track. A head moving exactly between these tracks spans half of each servo data track and reads each half-track with equal amplitude. The head so positioned is at a data track center. However, when it is off data track center, the head will read the pattern on one servo data half-track at a higher amplitude than the pattern on the other half-track. This difference in amplitude is a measure of the distance the head is off data track center.

It is common in servo systems to peak detect the patterns from each half-track, which most commonly consist of spaced pulses of equal amplitude. The output of the peak detector is smoothed through a passive low pass filter (usually R-C) and then differentially amplified. This difference is the position error signal.

Defects in the magnetic media cause noise either in the form of high amplitude spikes or dropouts. In either case, the peak detector captures and holds a large but false value for the duration of the pulse sequence. The low pass filter holds the effect of this disturbance for a relatively long time. In the case of embedded servo segments, the false position error signal may also be held constant while the disk rottes to the next servo segment, thereby magnifying the problem.

Noise causing defects occur with increasing frequency as the number of tracks per inch increases. The move toward an increased number of tracks per inch and to the embedded servo technique thereby necessitates an improved method of demodulating the servo data.

Recent servo data demodulators have incorporated integrators to time average the signal. See e.g., U.S. Pat. Nos. 4,101,942 to Jacques, assignee Xerox Corp., 4,130,844 to Klinger, assignee Xerox Corp., and 4,208,679 to Hertrich, assignee Digital Equipment Corp. Jacques '942 and Hertrich '679 also have redesigned servo data patterns which have time-averaged self-nulling patterns when the read head is centered between the two servo half tracks. A noise spike having equal and opposite amplitude flux reversals would thus be integrated to zero.

While integrators may satisfactorily accommodate noise spikes, they are unduly susceptible to DC and offsets as recognized by Klinger '844. These must be compensated for by complicated circuitry such as that disclosed in Klinger.

It remains desirable to render demodulators for conventional servo data patterns relatively invulnerable to noise, especially in view of existing disk packs having such servo data patterns prerecorded on them.

SUMMARY OF THE INVENTION

The present invention acheives improved noise filtering in track centering servo systems by averaging the peak values of te last N pulses. The effects of a noise spike or a dropout are thereby reduced by a factor of N.

The means of implementing the present invention are deemed adequately described in the abstract.

BRIEF DESCRIPTION OF THE DRAWINGS

FIG. 2 shows a peak detector as used in conventional peak detecting demodulators.

FIGS. 3A and 3B show the peak detector's output with the modified tribit pulses of FIGS. 1A and 1B.

FIG. 5 shows a peak detector as used in the preferred embodiment.

DESCRIPTION OF THE PREFERRED EMBODIMENT

A conventional track centering servo system typically has one servo track prerecorded with one pulse pattern (even) and an adjacent servo tack prerecorded with a different pulse pattern (odd). If each pattern is sensed by the drive's read head at the same amplitude, the head is at data track center. If one pattern is sensed at an amplitude different from the other, the head is off center. The amplitude difference is used to servo the head towards data track center.

Figure 1:
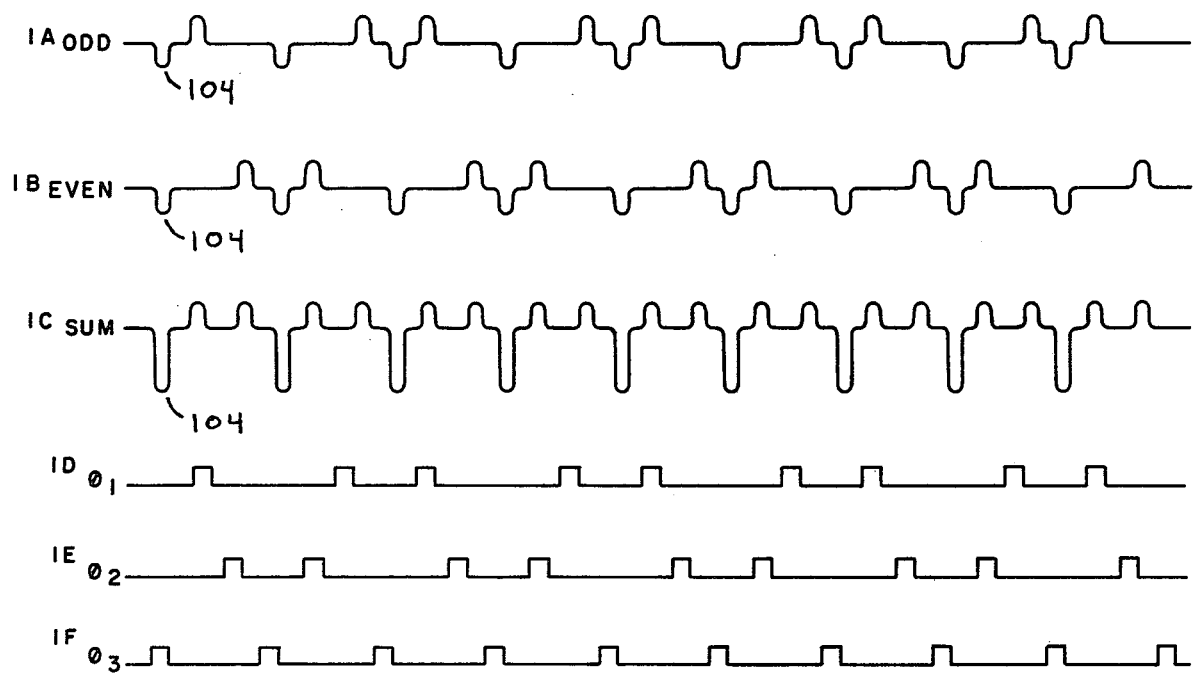
FIG. 1A through FIG. 1F shows a typical pulse pattern which may be recorded on even and odd tracks of the disk (1A and 1B), the analog sum of these two signals as read by the read head (1C) and associated timing pulses for distinguishing between even, odd and sync pulses in the combined pulse.

A typical technique used to distinguish one pulse pattern from another is to time space an odd pulse peak, for example, from an even pulse peak, as shown in FIGS. 1A and 1B (the initial negative going pulse 104 is used as a sync pulse.) The read head reads the two servo tracks as a unit in the form shown in FIG. 1C.

As the differences in amplitude between the even and odd pulses contain the significant position information, a typical circuit introduces the two pulse trains into a differential amplifier to form a position error signal. Due to the time delay between the two pulses, a sample and hold circuit holds the leading pulse until the arrival of the trailing pulse so that an accurate comparison may take place.

Such a sample and hold function is conventionally performed by a peak detector circuit such as shown in FIG. 2. The output of peak detector 2 for the even and off pulse patterns shown in FIGS. 1A and 1B are shown in FIGS. 3A and 3B, respectively. The peak detector 2 contains an R-C smoothing circuit 3 so that a pulse will slightly decay from pulse to pulse. The decay is fast enough to allow the servo system to follow decreases in amplitude pulse to pulse (caused by head movement away from track center) while at the same time maintaining the peak value sufficiently for comparison to the other servo track's pulse.

These conventional circuits, while simple, are unduly vulnerable to noise, either high amplitude spikes or low amplitude drop outs. In the case of a noise spike, illustrated by the dashed line of FIG. 3A, the peak detector 2 will copy the excursion and hold it for a significant period of time depending on the RC time constant and the extent of excursion. During this time, the position error signal developed by comparison of the output of the odd peak detector with the even peak detector will be in significant error, perhaps forcing the head to move an undesirable distance away from track center.

With embedded servo data, the problem is further compounded by the fact that the resulting position error signal must be held in a sample and hold device while the disk rotates from a servo segment, over a data segment to the next servo segment.

The present invention ameliorates the above problem by averaging the most recent pulse with the last N minus 1 pulses (N being an arbitrary number chosen to accommodate response time versus expected noise level, a typical N would be on the order of 8 or 16). Thus, the effect of a major excursion away from the average value of the preceding N minus 1 pulses is diminished by a factor of N.

Figure 4:
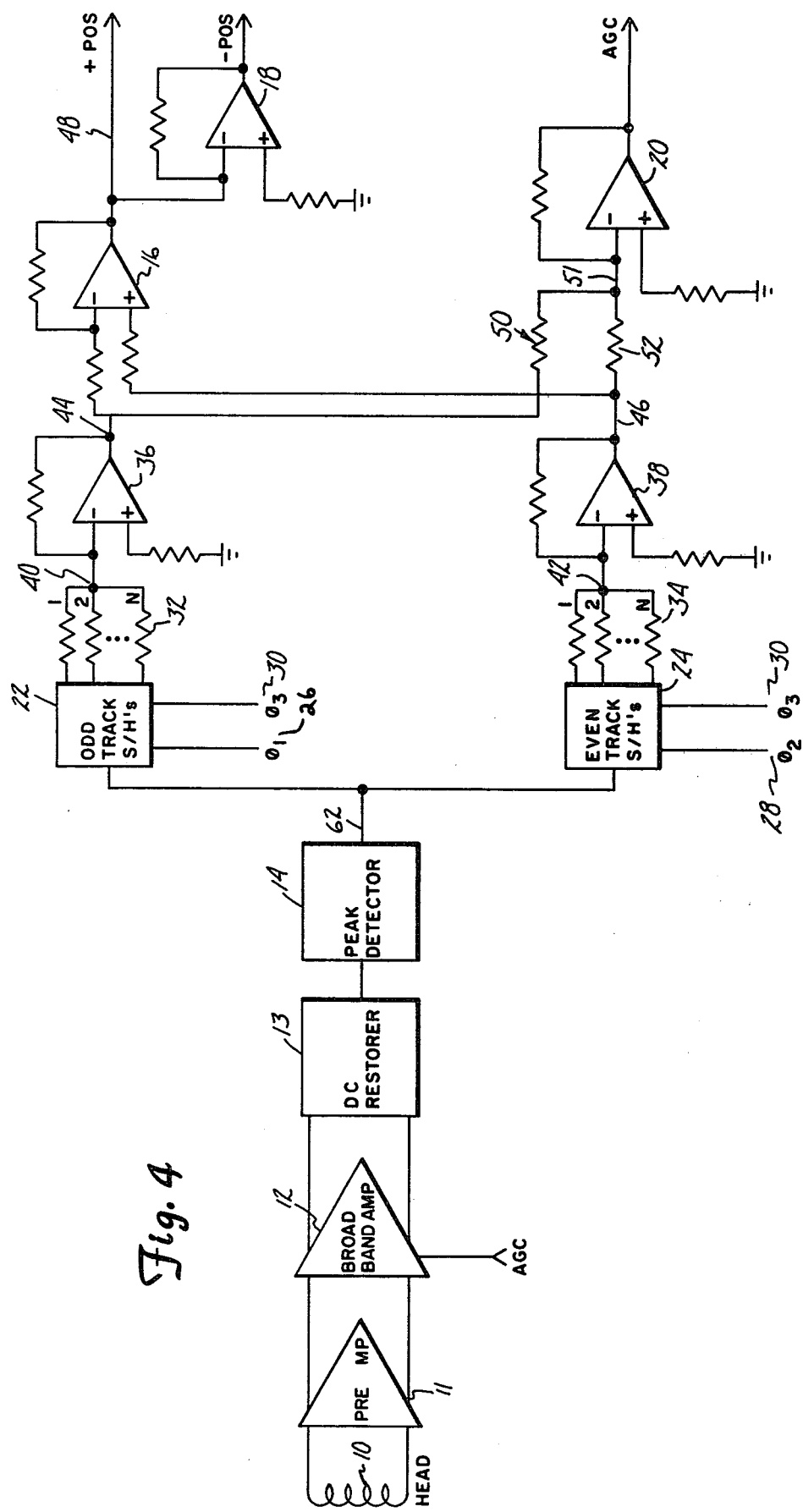
FIG. 4 shows a schematic, partially in block form, of the present noise filter averaging system in conjunction with conventional preceding and following circuitry.

A block diagram of a circuit implementing the above method is shown in FIG. 4. Read head 10, preamplifier 11 and broad band amplifier 12 are conventional. DC restorer 13 is necessary in those embodiments using a bucket brigade, shown in FIG. 5, for averaging. Its function is to provide a DC offset to any AC components of a pulse, such as one finds in a dibit pulse, so that only a unipolar voltage appears at the input 62 to the bucket brigade.

The peak detector 14 is a circuit such as shown in FIG. 5. Its function is to hold the level of a pulse long enough for succeeding circuitry to "see" it. A typical pulse, for example, will have a width of 200 nanoseconds, while the minimum sampling period of the following circuitry conventionally requires a pulse width significantly larger than this. An R-C smoothing circuit is not incorporated.

The output 62 of the peak detector 14 is split and provided as an input to odd and even track sample and hold circuits 22 and 24, respectively. Each set of circuits sample and hold the analog information present on the input line 62 in the form of pulses. Each of the sample and hold circuits is adapted to hold the analog value of one pulse. There are N sample and hold circuits in a set which are adapted to receive and output the pulses on a first-in first-out basis (fifo). After N pulses have been received, the sample and hold circuits will hold the latest received N pulses.

Each of the sample and hold circuits has an output through a resistor, shown as resistor networkds 32 and 34 for the odd and even tracks, respecitvely. Each output is connected to a summing junction, either 40 or 42, to form at the junction an average value of the outputs 32 or 34. The average value is proportional to the analog average value of the peak voltages of the last N pulses.

This average value voltage is buffered by summing amplifiers 36 and 38. The output of the summing amplifier for the odd track pulses 44 is provided as one input and the output of the summing amplifier for the even track pulses 46 is provided as the other input to differential amplifier 16, which effectively subtracts the two signals from each other and provides their difference as position error signal output 48. This output may be used by downstream electronics to servo the head toward track center. The position error signal output 48 may also be inverted by inverting op amp 18 to form a complimentary signal for downstream electronics.

The outputs of summing amplifiers 36 and 38 are also averaged through resistors 50 and 52 and summing junction 51. This average value is buffered through scaling amplifier 20 to form an automatic gain signal (AGC) for use by broad band amplifier 12, as is known in the art.

Figure 6:
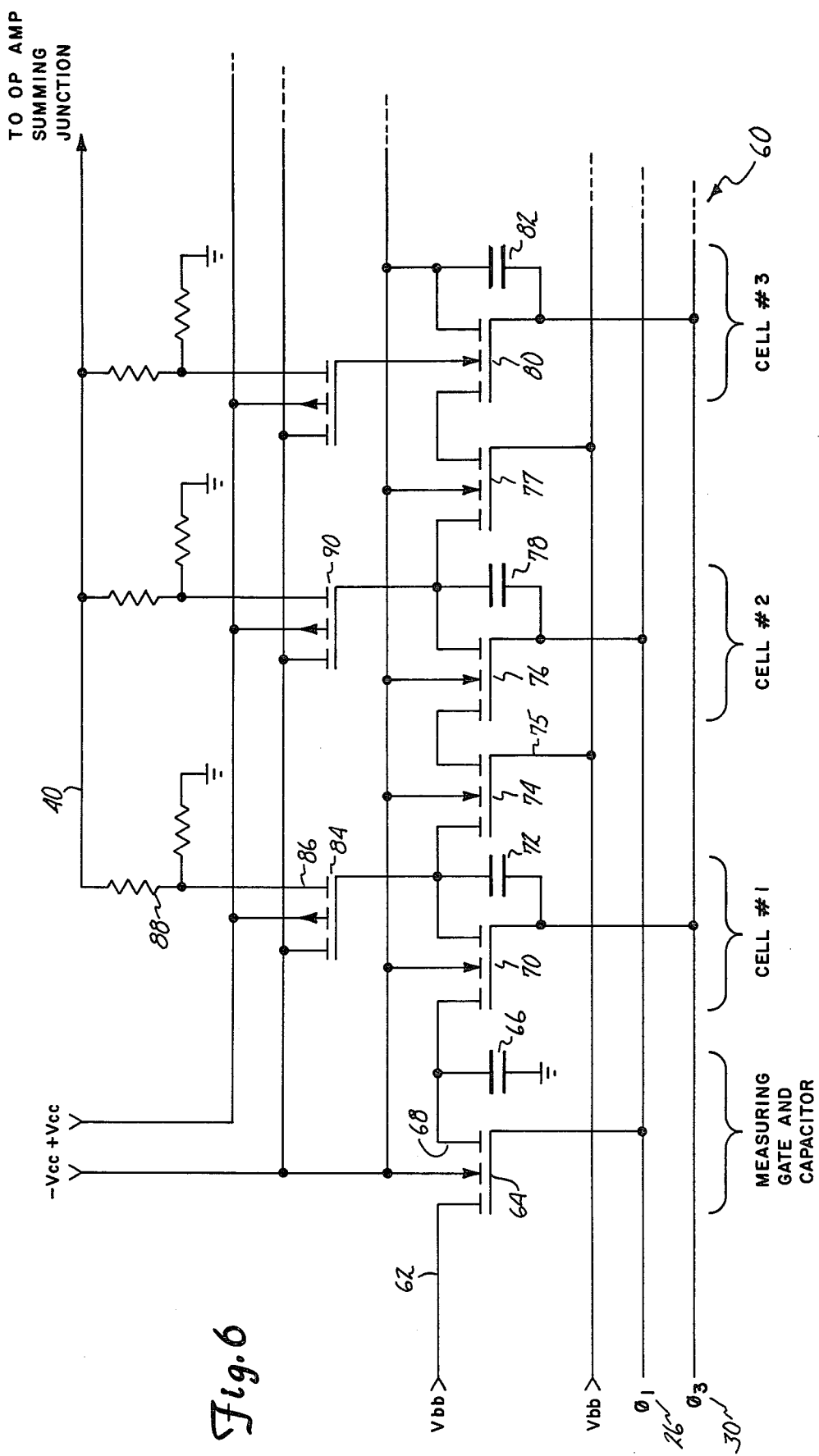
FIG. 6 shows a bucket brigade device as one means for implementing pulse averaging.

FIG. 6 shows a preferred form of one set (odd) of the sample and hold circuits 22 and 24. It comprises a bucket brigade analog shift register 60. Such a register in a slightly varied form is a TAD-32 Tapped Analog Delay available from the Reticon Corporation, Sunnyvale, CA.

Analog information present on line 62 is copied into capacitor 66 when the N-channel MOS FET gate 64 is enabled. Gate 64 is enabled when clock $\phi1$ is high. $\phi1$ is high, as can be seen in FIG. 1D, when an odd pulse is present. (A similar bucket brigade is provided for even pulses, in which case clock $\phi2$, on during the presence of even pulses, is substituted for clock $\phi1$).

Thereafter, $\phi1$ goes low and the analog voltage on capacitor 66 is captured.

At the rise of $\phi3$, which is on during the sync pulse, gate 70 is enabled, and a positive voltage is applied to one side of capacitor 72. This voltage draws the charge on capacitor 66 to capacitor 72 and the parasitic capacitance of gates 70 and 74. Gate 74 is continuously biased on but at a voltage slightly less than either $\phi1$ or $\phi3$.

The presence of a charge on capacitor 72 causes an increase in the gain of p-channel MOS FET 84 proportional to the amount of charge. The drain 86 of MOS FET 84 is connected through resistor 88 to the summing junction 40.

After the sync pulse has passed, gate 70 turns off, isolating the charge present on capacitor 72 from the input capacitor 66.

During the presence of the next odd pulse, gates 64 and 76 are enabled. The new pulse is sampled by capacitor 66. The pulse present in capacitor 72 and gate 74 is transferred to capacitor 78 and MOS FET 76 due to the higher voltage on $\phi1$. The output voltage of MOS FET 84 will go to zero and that of MOS FET 90 will to to the formerly output by MOS FET 84.

At the rise of the next $\phi3$ clock, the analog charge present in capacitors 66 and 78 are copied into capacitors 72 and 82, respectively.

Each gate/capacitor pair can be viewed as a storage cell and each pair of cells viewed as a sample and hold circuit. The even numbered cells are active (that is, they will be holding a pulse) from a given sampling period to a sync pulse. The odd numbered cells are active from a sync pulse until the next sampling period.

Figure 7:
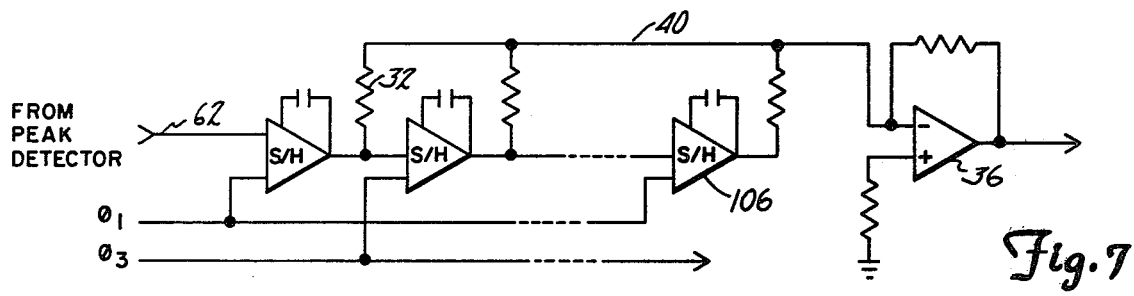
FIG. 7 shows a second means for implementing the pulse averaging in the circuit of FIG. 1.

A second embodiment of the sample and hold circuits 22 and 24 is illustrated in FIG. 7. Conventional sample and hold cells 106 such as the LF 398 or Signetics 5537 are available from the Signetics Corporation, Sunnyvale, CA. They are arranged such that one's output is latched to another's input. Their clock inputs are alternately connected to φ1 or φ3 (or for the even pulses sample and hold circuits 24, φ2 and φ3). Their operation thus is virtually identical to the operation of the above described bucket brigade. Their outputs are also connected through resistor network 32 (or 34) to summing junction 40 (or 42) and thereafter provided as an input to summing amplifier 36 (or 38) as heretofore described.

Figure 8:
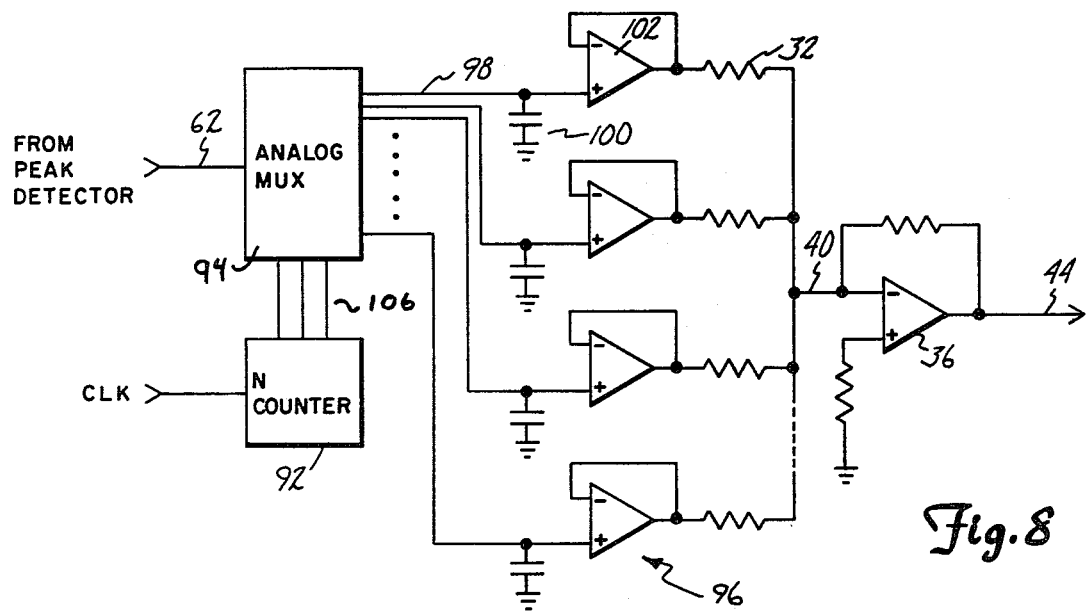
FIG. 8 represents a third means for implementing the pulse averaging in the circuit of FIG. 1.

A third embodiment is shown in FIG. 8. It comprises three conventional components: an N counter 92, an analog multiplexer 94 and a column of N individually addressabel sample and holds cells 96 comprising a capacitor interconnected between line 98 from multiplexer 94 and ground 100, and a voltage following op amp 102. The op amps 102 are connected through resistors 32 (or 42) to summing junction 40 (or 42) and scaling on amp 36 (or 38) as heretofore described.

The N counter 92 is connected to φ3 or other means to signal the presence of the sync pulse 104. Each time sync pulse 104 is received, the N counter counts 1. The count is placed on lines 106, which are provided as the control inputs to analog multiplexor 94. Analog multiplexor 94 connects the input line 62 to one and only one sample and hold cell 96 according to the count present on control lines 106.

After counting N sync pulses, N counter 92 overflows to 0. Thus, the sample and hold cells 96 are addressed on a recirculating basis. Pulses are input one by one into successive sample and hold cells 96 and retained until a given cell is again addressed by the recirculating multiplexor 94, when a new pulse is sampled and held. The last N pulses received will then be present in the sample and hold cells 96 and a voltage proportional to their average will be present at the output of scaling amplifier 44 (or 46).

It will be appreciated that the above averaging circuitry also inherently incorporates the sample and hold function necessary for embedded servo data systems. Other similar means of implementing a pulse averaging circuit will occur to those skilled in the art consistent with the general purpose of providing an average of the last N pulses of track centering servo information to reduce the effects of noise spikes and dropouts.

These means are deemed to be within the scope and spirit of the present invention in which I claim:

1. In a disk track centering servo system having even pulses written on one servo track and odd pulses written on an adjacent servo track, a read head for reading information, including said pulses, means for preamplifying said pulses, and means for distinguishing between odd and even pulses, the improvment comprising:

first and second pluralities of analog sample and hold circuits, each having an output;
means for inputting even pulses, one pulse per circuit, into said first plurality of said circuits; said first circuits holding the latest received N pulses, where N is a predetermined number;
means for inputting odd pulses, one pulse per circuit, into said second plurality of said circuits; said second circuits holding the latest received N pulses, where N is a predetermined number;
means for analog summing the outputs of said first plurality of circuits to form a first sum;
means for analog summing the outputs of said second plurality of circuits to form a second sum; and
means for deriving the difference between said first sum and said second sum to form a position error signal.

2. Apparatus according to claim 1 wherein each of said pluralities of circuits comprises an analog shift register.

3. Apparatus according to claim 2 wherein each of said analog shift registers includes a series of interconnected gate-capacitor pairs, the control means of the gate and one terminal of the capacitor of a first, third, fifth and succeeding odd numbered pairs connected to a first clock, the control means of the gate and one terminal of the capacitor of a second, fourth, sixth and succeeding even numbered pairs connected to a second clock oppositely polarized from said first clock and means supplying said first and second clocks to said registers.

4. Apparatus of claim 3 wherein said gates comprise MOS FET's and further including an additional MOS FET interconnected between each of said pairs, the gate of which is biased on.

5. Apparatus of claim 3 wherein said analog shift register further includes an input gate, the control means of which is connected to said second clock, and a capacitor connected to receive the charge transferred through said input gate and further connected to the gate of said first pair.

6. Apparatus according to claim 1 wherein ech of said inputting means includes multiplexer means for addressing a given one of said circuits according to a count on its control inputs, and counter means for counting each time a pulse is input to a circuit and placing that count on said multiplexor's control inputs; said counter means' count overflowing to zero after N-1 counts.

7. Apparatus according to claim 6 wherein each of said circuits comprises:
an input line;
a capacitor interconnected between said line and ground; and
a voltage-follower means having its input connected to said line.

* * * * *